J. D. Bryson,
Water Wheel.
N° 82,486.      Patented Sep. 29, 1868.
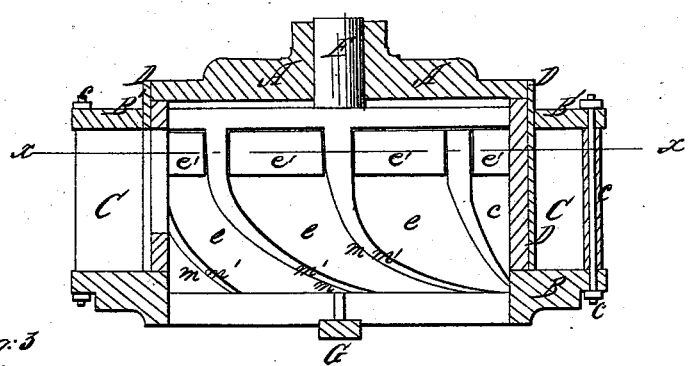
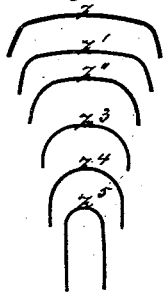
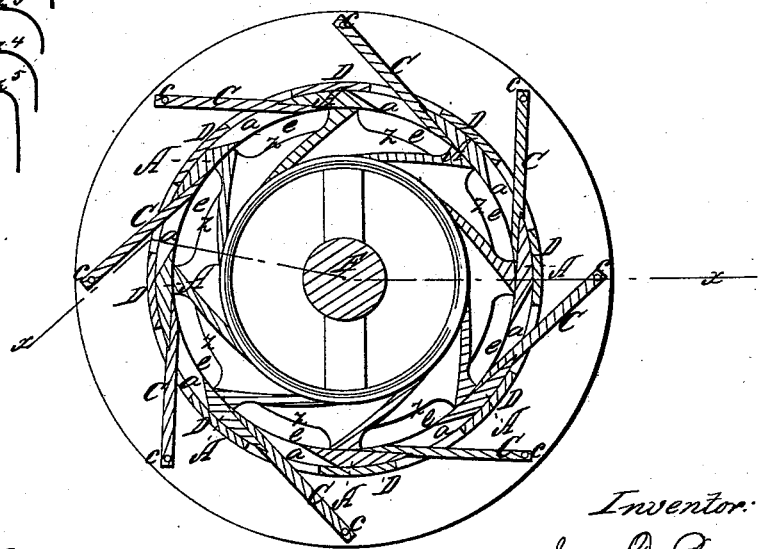
Witnesses          Inventor:

UNITED STATES PATENT OFFICE.

JAMES D. BRYSON, OF NEWCASTLE, PENNSYLVANIA.

IMPROVED CASING FOR WATER-WHEELS.

Specification forming part of Letters Patent No. 82,486, dated September 29, 1868.

*To all whom it may concern:*

Be it known that I, JAMES D. BRYSON, of Newcastle, in the county of Lawrence and State of Pennsylvania, have invented a new and Improved Casing for Water-Wheels; and I do hereby declare that the following is a full, clear, and exact description of the construction and operation of the same, reference being had to the annexed drawings, making a part of this specification, in which—

Figure 1 is a vertical section through the line $x\,x$ of Fig. 2. Fig. 2 is a horizontal section through the line $x\,x$ of Fig. 1. Fig. 3 represents different horizontal sections of a bucket, taken at different points from top to bottom.

This invention consists of a casing for water-wheels made up of a curb having a number of apertures for the passage of water, and provided at its lower edge with an external circular flange, and also provided with a certain number of guides tangential to the inner surface of said curb, which guides pass through the aforesaid apertures, and serve to facilitate the flow of water into the curb, and also to support a horizontal ring upon their upper edges, said ring being concentric with the curb, between which and the ring is passed a circular gate, which may receive a rotary motion sufficient to cause it to open and close the aforesaid apertures in the curb, and also the vertical motion necessary to its adjustment in or removal from its place between the before-mentioned ring and curb.

In the drawings, A A represent the curb, having apertures $a\,a$ for the passage of water and the insertion of the guides C. B is a flange that projects outward from the lower part of the curb. C C are vertical metallic plates bolted at their outer edges to the outer edges of the flange B and the ring B', which latter rests upon the upper edges of the said plates, and is concentric with the curb A, there being a space between the said curb and ring wide enough to permit the circular gate D to be dropped in between them.

The gate D slides around the curb and shuts against the vertical walls of the plate C near their centers, the said plate extending through the walls of the ring by means of the apertures $a$. The plates C may be removed from the curb upon detaching the bolts which fasten them thereto.

E represents a water-wheel, which, though forming no part of my invention, I will briefly describe. It has side brackets $e\,e$, the lower portions of which discharge water at the bottom of the curb by lateral action, and the upper portions of which are provided with curved passages $e'$, through which a portion of the water escapes to the center of the wheel, where it is discharged on the circular-vent principle.

The buckets $e$ are made wide and shallow at their tops and narrow and deep at their lower ends. Cross-sections of them at any point below the center vent-orifice would be represented by the lines $z\,z$, Fig. 3. The edges of the buckets are curved, as shown at $m\,m$, Fig. 1, and the whole bucket partakes of the general nature of that curve. Such part of the water as cannot escape through the side vents passes off to the center through the orifice $e'$.

Having thus described my invention, what I claim as new, and desire to secure by Letters Patent, is—

A casing for water-wheels consisting of the curb A, the flange B, the ring B', supported upon the guide-plates C, and the gate D, all constructed and arranged to operate substantially as described.

To the above specification of my improvement I have signed my hand this 15th day of February, 1868.

JAS. D. BRYSON.

Witnesses:
CHAS. A. PETTIT,
SOLON C. KEMON.